United States Patent [19]

Doyle

[11] Patent Number: 4,847,604
[45] Date of Patent: Jul. 11, 1989

[54] METHOD AND APPARATUS FOR IDENTIFYING FEATURES OF AN IMAGE ON A VIDEO DISPLAY

[76] Inventor: Michael D. Doyle, 511 W. Oregon, Urbana, Ill. 61801

[21] Appl. No.: 90,112

[22] Filed: Aug. 27, 1987

[51] Int. Cl.⁴ .............................................. G09G 1/16
[52] U.S. Cl. .................................... 340/706; 340/703; 340/709; 340/799
[58] Field of Search ............... 340/701, 703, 706, 707, 340/709, 710, 721, 723, 798, 799; 364/518, 521, 188, 189, 190; 434/322, 323; 273/DIG. 28

[56] References Cited

U.S. PATENT DOCUMENTS

| | | | |
|---|---|---|---|
| 4,074,254 | 2/1978 | Belser et al. | 340/799 |
| 4,200,867 | 4/1980 | Hill | 340/703 |
| 4,203,107 | 5/1980 | Lovercheck | 340/799 |
| 4,249,172 | 2/1981 | Watkins et al. | 340/799 |
| 4,303,912 | 12/1981 | Stafford et al. | 340/703 |
| 4,395,707 | 7/1983 | Satrapa | 340/703 |
| 4,414,636 | 11/1983 | Ueda et al. | 364/526 |
| 4,439,759 | 3/1984 | Fleming et al. | 340/703 |
| 4,441,104 | 4/1984 | Finney, II | 340/724 |
| 4,451,824 | 5/1984 | Thayer et al. | 340/720 |
| 4,471,465 | 9/1984 | Mayer et al. | 364/900 |
| 4,481,529 | 11/1984 | Kerling | 358/30 |
| 4,484,187 | 11/1984 | Brown et al. | 340/703 |
| 4,488,245 | 12/1984 | Dalke et al. | 364/526 |
| 4,517,654 | 5/1985 | Carmean | 364/521 |
| 4,520,454 | 5/1985 | Dufour et al. | 364/900 |
| 4,521,014 | 6/1985 | Sitrick | 273/DIG. 28 |
| 4,524,421 | 6/1985 | Searby et al. | 364/521 |
| 4,570,217 | 2/1986 | Allen et al. | 364/188 |
| 4,574,277 | 3/1986 | Krause et al. | 340/703 |
| 4,580,134 | 4/1986 | Campbell et al. | 340/703 |
| 4,583,186 | 4/1986 | Davis et al. | 364/526 |
| 4,586,036 | 4/1986 | Thomason et al. | 340/720 |
| 4,600,918 | 7/1986 | Belisomi et al. | 340/711 |
| 4,616,220 | 10/1986 | Grunewald et al. | 340/747 |
| 4,620,289 | 10/1986 | Chauvel | 364/521 |
| 4,648,028 | 3/1987 | DeKlotz et al. | 364/188 |
| 4,648,046 | 3/1987 | Copenhaver et al. | 364/518 |
| 4,648,050 | 3/1987 | Yamagami | 364/526 |
| 4,673,930 | 6/1987 | Bujalski et al. | 340/703 |
| 4,675,666 | 6/1987 | Peterson | 340/721 |
| 4,710,806 | 12/1987 | Iwai et al. | 340/703 |

OTHER PUBLICATIONS

Alan Borning, "Thinglab-A Constraint-Oriented Simulation Laboratory," Stan-CS-79-746, Ch. 2, pp. 14-37 (1979).

Steve Ciarcia, "High-Resolution Sprite-Oriented Color Graphics," Byte, pp. 57-70, 72, 76, 78, 80 (Aug. 1982).

Primary Examiner—John W. Caldwell, Sr.
Assistant Examiner—Jeffery A. Brier
Attorney, Agent, or Firm—Richard C. Auchterlonie

[57] ABSTRACT

A computer graphic interface allows a user to obtain descriptive information concerning a feature of a displayed image by pointing to the location of the feature. Conversely, the user may enter descriptive textual information, and the locations of responsive features are indicated. The data processing and memory storage requirements are minimized by encoding information about the image as a pixel bit map, and a color map in which the addresses or indices of the color map are correlated with the addresses or pointers to strings of descriptive information. Each color map address corresponds to a predefined set of features and descriptive information about those features. Since the pixel bit map defines a color map address for each location on the image, suitable programming of the color map can insure proper correlation of descriptive information with corresponding locations on the image. The correlation between color map addresses and the descriptive information about the features is represented most compactly by arranging or sorting the entries in the color map so that there is a correspondence between each predefined feature and a continuous range of color map addresses. Therefore, for a specified color map address, the corresponding set of features and their pointers can be found by comparing the specified color map address to the limits of the color map address ranges for the various features.

27 Claims, 3 Drawing Sheets

METHOD AND APPARATUS FOR IDENTIFYING FEATURES OF AN IMAGE ON A VIDEO DISPLAY

BACKGROUND OF THE INVENTION

1. Field Of The Invention

The present invention relates generally to video displays, and more particularly to display systems in which an image is displayed to enable a user to recognize distinct features. Specifically, the present invention is directed to the problem of correlating the features of a displayed image with information which further identifies or describes the features.

2. Description Of The Related Art

Systems for providing high-quality digital images on video display screens are well known. The most common is known as a bit mapped raster scan display system. Such a system includes a memory which stores a set of bits corresponding to each pixel location on the display screen, and the information in the memory is read out and displayed in synchronism with the raster scan. The memory including the set of bits for the pixels is known as the pixel bit map.

For displaying high quality images having a variety of gray shades or colors, the set of bits for each pixel may specify the gray shade or color of the pixel. About 24 bits of resolution—eight bits for each of three primary colors—are required for reproducing the entire spectrum of chromatocity and luminance within the resolving ability of the human visual system. In order to reduce the memory requirements for obtaining high color resolution, it is well known to provide a color look-up table or "color map" which is indexed by the set of bits for each pixel. In this case the color map need store only once each color that is actually found in the image being displayed.

The use of a color map has many advantages in addition to the reduction of the memory requirements for the pixel bit map. As described in Hill U.S. Pat. No. 4,200,867, the color map can be used as a palette allowing the video display user to electronically compose or "paint" video images. For mass storage of digital images or band limited transmission between video systems, the color map can be used to reduce the required bit transmission rate and bit storage capacity. In this regard, the color map can also be used in connection with other data compression techniques, such as in the color block coding scheme disclosed in Campbell et al., U.S. Pat. No. 4,580,134.

The use of a color map further permits all pixels having the color identified by a single index to be modified simultaneously without disturbing the pixel bit map. The modification can be done for one color at a time by storing the color map in a read-write or random access memory, and writing a new color value to the memory address corresponding to the index of the color to be changed. Fleming et al. U.S. Pat. No. 4,439,759, for example, describes the use of a data processor for providing color blinking by means of a linked list of multiple processes. For example, using this technique a ball may appear to bounce across an image, a river may appear to flow, or stars may appear to twinkle.

As described further in Brown et al. U.S. Pat. No. 4,484,187, it is possible to change all of the colors simultaneously by using a color map having a plurality of segments for the range of indices specified by the pixel bit map, and by using a data processor to select which segment is to be addressed by the pixel bit map. In other words, the data processor substitutes one color map segment for another color map segment in order to change simultaneously a plurality of colors. The memory capacity of the color map must be increased in this case, but in practice the substitution is easily performed by using a memory circuit having at least one additional address select line which receives an output of the data processor instead of the pixel bit map. Brown et al. also discloses that the substitution of one properly programmed color map segment for another can instantly provide different priority for various images stored in different planes of bit map memory.

In order to display moving objects which may obscure a background or obscure each other, it is common to provide a bit map memory which has, for each pixel, a respective set of bits for each object or the background. Each set of respective bits is stored in a respective "bit plane" for the bit map memory. The respective sets of bits for each pixel are compared to each other in a priority decoder which has an output which controls the select input of a multiplexer which selects one of the sets of bits for display. The priority decoder, for example, operates the multiplexer to select the set of bits which represents the largest binary number, or selects the set of bits which represents a non-zero binary number from the bit plane assigned the highest priority. In the latter case, the binary number zero represents a transparent area in the bit plane. See, for example, Ciarcia, "High-Resolution Sprite-Oriented Color Graphics," Byte, August 1982, pp. 57–80.

The priority of an object can also be encoded as an attribute separate from the color map index. Peterson U.S. Pat. No. 4,675,666, for example, describes a video display system in which a user can display "true" objects by individual pixels in a "bit-plane mode," or fixed objects in a "list mode." The fixed objects in a list mode are defined in "image tables" which contain their pixel-by-pixel description. A list mode screen memory is arranged as a "display list" of pointers to entries in the image tables, which include "attributes" of the images. These attributes allow each individual occurrence of an image to be altered, for example, by underlining or flashing. By using a suitable attribute list and a suitable priority decoding circuit, Peterson says that the color of a "true" object overlapping a fixed object of lesser priority may be modified such that it appears that the true object has entered the shadow of the fixed object.

Brown et al. U.S. Pat. No. 4,484,187 discloses that the priority decoding function can be fully programmable by providing a unique color map address for each combination of bits from the respective sets of bits from the various bit map planes. Specifically, the output from the memory for one bit plane is used as one portion of the color map address and the output from the memory for another bit plane is used as another portion of the color map address. Therefore, the collisions or overlap between objects in different bit planes provide unique color map addresses, and the color map can be programmed at these addresses to provide any desired color for the points of collisions or overlap. FIG. 6 in Brown et al. shows ranges of color map addresses assigned to respective objects in a specific example.

A color map display system allowing rapid shifting of subpictures and rapid changing of the subpictures or the overall picture (such as having invisible information suddenly appear on the display screen) is described in Allen et al. U.S. Pat. No. 4,570,217. As described in Col.

4, line 50 to Col. 5, line 17, the screen is broken down into a plurality of zones, each zone providing up to sixteen different colors selectable for each pixel in the zone. The 16 colors from each zone are selected from one of four color palettes. Each color palette in turn selects its colors from up to 512 separate colors. Typically, a zone comprises eighty pixels of graphic information and thus each of those eighty pixels can be selected to have any one of the zone colors. It is said that by use of the color palette technique in association with each of the plurality of zones, the graphics can present complicated displays. Also, a high level graphics language is described for facilitating the design and configuration of a process control system. The graphics language has static and dynamic commands for facilitating graphics display update on a real time basis.

The ability to recognize colors in a real-world digital video image is important for geological and agricultural assessments, military reconnaissance, city planning and land use, and coastal oceanography. Dalke et al. U.S. Pat. No. 4,488,245 discloses a computer and video display system which is said to be suitable for such color recognition applications. The color picture is digitized and represented as three eight-bit words for each pixel in a 1024×1024 pixel array image. The first value is an approximation of luminance, while the second and third values represent variations of chromaticity or chrominance. Pattern recognition techniques are used to determine if a given color value lies within a specified three-dimensional color subspace. A high-speed digital processing technique is said to enable the real time modification of any portion of the color image within the display. A weighting function is disclosed to enable the operator to modify or insert colors.

In Col. 15 lines 12–21, it is said that in operation a threshold circuit is used to generate a mask to enable the operator to determine if, in fact, a color selection circuit has correctly identified all of the objects having the targeted colors; the mask is automatically superimposed over all of the areas on the color display having the same color value as the pixels selected during the sampling process. In Col. 15, lines 55 to 58, it is said that if desired, additional circuitry may be incorporated in the data processing unit to enable the operator to identify certain areas by their physical coordinates using a cursor, and a light pen or stylus.

In simulation programs using the techniques of artificial intelligence, it has become common to provide a user interface which displays a schematic diagram of a system under consideration, and which permits the user to graphically select or modify components of the schematic diagram by manipulating a pointing device. Further, upon such selection or modification, certain textual attributes of the object will be automatically modified if necessary and displayed in a window area adjacent to the schematic diagram. In such programs, the coordinates of the cursor are compared to coordinates defined for the components of the schematic diagram, in order to determine whether the user has selected a component. See, for example, Borning, "Thinglab—A Constraint-Oriented Simulation Laboratory", Chapter 2, Stanford Computer Science Department Report STAN-CS-79-746 pp. 14–37 (July 1979).

SUMMARY OF THE INVENTION

The primary object of the present invention is to provide an improved method of identifying predefined features of an image on a video display.

A specific object of the invention is to provide an improved method of operating a video display system for providing descriptive information responsive to user identification of the physical location of a perceived feature of a displayed image. A related object is to provide such a system with the capability of receiving a description from the user, and indicating the physical locations of predefined features which are responsive to the description.

Another object of the invention is to provide an efficient method of storing digitized video images along with descriptive information about various features of the images and information about the locations of the features in the images.

Briefly, the advantages of the present invention stem from encoding information about a video image as a pixel bit map and a color map in which the addresses or indices of the color map are correlated with the addresses or pointers to strings of descriptive information about predefined features of the video image. In other words, each color map address corresponds to a predefined set of features and descriptive information about those features. Since the pixel bit map defines a color map address for each physical location on the image, suitable programming of the color map can insure proper correlation of descriptive information with corresponding physical locations on the image. The correlation between color map addresses and the descriptive information about the features is represented most compactly by arranging or sorting the entries in the color map so that there is a correspondence between each predefined feature and a continuous range of color map addresses. Therefore, for a user specified physical location, the corresponding color map address can be found by addressing the pixel bit map, and the corresponding set of features and pointers can be found by comparing the corresponding color map address to the limits of the color map address ranges for the various features, for example, by a binary tree search or by a table look-up procedure.

Conversely, given a user specified description, the descriptive information for the various features can be searched to determine whether there is a correspondence with the user specified description, in order to find the features responsive to the user specified description. Next the address limits of the color map memory are found which correspond to responsive features. The physical locations of the features on the displayed image are then indicated, for example, by temporary modification of the color map entries at each address within the address limits of the responsive features.

It should be apparent that separate pixel bit maps are not required for indexing both the color map and a pointer file in order to correlate each pixel with one or more strings of descriptive information. Moreover, in most real-world applications, the features of interest are highly correlated with ranges of color in the real-world images. Therefore, it is possible to use a single pixel bit map or pixel plane of common indices for representing the video image and also for correlating descriptive information with the pixels, without requiring the memory capacity of the color map to be substantially increased, and without loss of perceived image quality. By assigning or sorting the entries of the color map so that predefined features correspond to respective continuous ranges of color map addresses, the memory space for storing the pointers is reduced. Therefore, digitized video images are capable of being efficiently stored along with descriptive information about various features of the images and information about the locations of the features in the images.

BRIEF DESCRIPTION OF THE DRAWINGS

Other objects and advantages of the invention will become apparent upon reading the following detailed description and upon reference to the drawings in which.

Figures 1, 2:
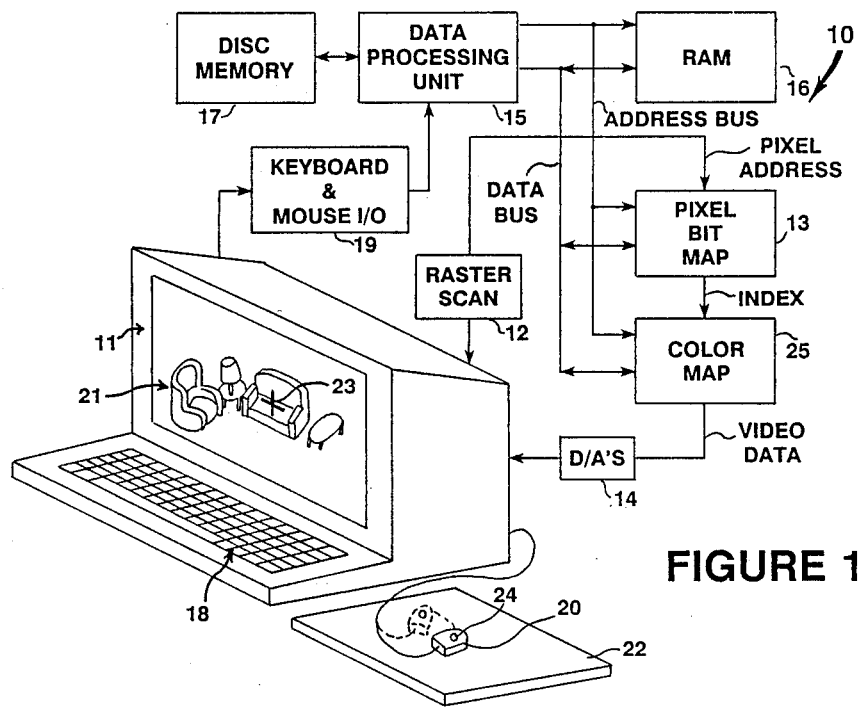
FIG. 1 is a schematic diagram of a video display system incorporating the present invention.
FIG. 2 is a diagram illustrating the organization and contents of a color map, a text pointer table, and certain text strings used to represent and describe the image and various features of the image displayed as shown in FIG. 1.

While the invention is susceptible to various modifications and alternative forms, a specific embodiment thereof has been shown by way of example in the drawings and will herein b described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1, there is shown a schematic diagram generally designated 10 of a video display system incorporating the present invention. As is conventional, the video display system includes a color video display 11 for displaying text and images. The video display preferably includes a raster-scanned color cathode ray tube as a display device, although the invention is applicable to other video display devices such as liquid crystal, plasma, and electro-luminescent displays, and the invention is also applicable to other kinds of scanning methods. A most suitable display device is, for example, an RGB analog video monitor sold by Sony Corporation.

In addition to the cathode ray tube and its analog circuits, the video display 11 includes raster scanning circuits 12 which generate pixel addresses in synchronism with the scanning of the cathode ray tube, a pixel bit map or memory 13 which stores information about the image intensity to be generated by the cathode ray tube at each pixel, and a digital-to-analog converter 14 responsive to video data for generating analog signals which control the electron guns in the cathode ray tube. Conventionally, the raster-scan circuits 12, the pixel bit map 13, and the digital-to-analog converters 14 are included on circuits that are in close proximity to a data processing unit 15 such as a microprocessor, and a certain amount of random access memory 16 which is connected to the data processing unit via address and data buses. The pixel bit map 13 is typically included in a memory that is multiplexed or time shared between the raster-scanning circuits 12 and the data processing unit 15. Typically the data processing unit 15 changes the data in the pixel bit map 13 during the vertical retrace of the raster-scanning, so that the entire image displayed by the display 11 appears to change instantaneously.

For permanently storing large amounts of data, and also for providing input of large amounts of data, the video display system 10 includes disc memory 17 such as a floppy magnetic disc drive, a hard magnetic disc drive, or an optical disc such as a CD-ROM drive.

For receiving text input from a user, the video display system 10 has a keyboard 18 which is connected to the data processing unit 15 through an interface circuit 19.

The video display system 10 further includes a manually-operated pointing device 20 for receiving an indication of a specified location on the image 21 displayed by the video display As shown in FIG. 1, the pointing device is a "mouse" which the user manually rolls over a flat surface 22. The data processing unit 15 is conventionally programmed to display a cursor 23 at a particular pixel on the image 21, and the data processing unit is further programmed to move the cursor up and down or left and right in response to the user's movement of the mouse 20 forward and back or left to right. The user moves the mouse 20 until the cursor 23 is aligned with a desired pixel location, and the user then specifies the desired pixel location by depressing a push button switch 24 on the mouse 20. It should be understood, however, that the kind of pointing device used by the operator is of no consequence to the practicing of the present invention, since a wide variety of other kinds of pointing devices can be used, such as a "track ball," a "joy stick," or a "light pen." All of these devices enable the user to specify a desired location on the image 21 displayed by the video display 11.

As described above, the video display system uses components which are found in a wide variety of programmable video display terminals and microcomputers. For practicing the invention, the video display system 10 further includes a color map 25 which is used in conjunction with the pixel bit map 13 to specify video data fed to the digital-to-analog converter 14 of the video display system. Color maps have provided a wide variety of advantages in video display terminals, as should be apparent from the detailed discussion above of the background of the present invention. In short, the color map 25 is used to represent the colors in the image independent of where those colors appear in the image. Specifically, the color map is a kind of memory which specifies the video data for each of a plurality of indices, and the pixel bit map 13 specifies one of these indices for each of the pixels in the image 21.

Suitable raster-scan circuits 12, pixel bit map 13, color map 25, and digital-to-analog converters 14 are found in commercially available video graphic circuit boards for personal computers. For practicing the invention, the inventor has used a "190 9 Revolution Board" manufactured and sold by the #9 Computer Corp., 725 Concord Avenue, Cambridge, Mass. This video graphics circuit board was inserted in an IBM-XT personal computer. Such a video graphics circuit board has a pixel bit map with 8 bit words for storing an index ranging from 0 to 255, and sufficient memory capacity for a pixel matrix array of 512 columns by 484 rows comprising the image 21. Moreover, the color map 25 specifies 24 bits of video data for each index, including 3 bytes of 8 bits each which specify the intensity of the red, green and blue primary colors.

The video display system of the present invention allows the user to obtain descriptive textual information concerning a feature of the displayed image 21 by using the pointing device 20 to point to a location of the feature. Conversely, the user may use the keyboard 18 to enter descriptive textual information, and the locations of responsive features are indicated by the video display 11. As shown in FIG. 1, the image 21 includes four distinct features which are recognized as a chair, a lamp, a sofa, and a table. It should be readily appreciated, however, that the present invention has great practical utility in connection with the identification of features occurring in complex real-world images such as the images that are analyzed for military reconnaissance or the remote satellite sensing of agricultural crops or land areas for mineral exploration. The inventor has found the present invention especially useful for identifying predetermined features of medical images and, in particular, tissue cross-sections. A collection of tissue cross-section images in the form of a "histology atlas" would be of great benefit to doctors and medical students as an aid in teaching and diagnosis.

Turning now to FIG. 2, there is shown a schematic diagram illustrating a specific organization of the color map 25 and certain data structures in the random access memory 16 which illustrate the method of the present invention.

In accordance with an important aspect of the invention, the color map 25 includes at least one entry for each different color included in the image 21, and includes additional entries for each color which occurs both inside and outside a predefined feature of the image. Therefore, a unique entry in the color map is provided for each color included in a distinct combination of features. Therefore, each index has associated with it a predefined set of features and a certain color.

For the predefined features in the image 21 shown in FIG. 1, there is no overlap between the features. Therefore, the above condition can be satisfied when the entries of the color map are preferably segmented into a continuous numerical range of indices for each of the predefined features. In general, this can be done so long as the features are either disjoint or related as sets and subsets.

Since each index corresponds to a particular combination of features as well as a color, the particular feature associated with a specified pixel location can be found by reading the index from the pixel bit map and then finding the particular combination of features associated with the index.

In accordance with an important aspect of the present invention, the memory of the video display system 10 further stores data describing the features associated with each index. Therefore, given the index of a user specified pixel location, the combination of features at that pixel location can be determined by reading from memory the descriptive data for the features associated with the index. In particular, as shown in FIG. 2 the random access memory 16 stores text strings 26 including a particular string for each feature. Also, the random access memory 16 stores a text pointer table 27 which specifies the text strings associated with each index. As further shown in FIG. 2, the text pointer table is very compact due to the fact that the text pointer table need merely store the numerical limits of each range of indices for the segment associated with each feature. Moreover, the text pointer table is relatively compact because the indices are associated with pointers to the text strings rather than the strings themselves.

By inspection of the contents of the color map 25, the text strings 26, and the text pointer table 27, it should be apparent that the first segment of the color map is addressed by indices ranging from 0 to 31 and it stores colors for the chair. The second segment of the color map stores colors at indices 32 to 63 for the lamp. Similarly, the third segment stores colors at indices 64 to 95 for displaying the sofa.

As a specific example, the user may operate the mouse 20 to move the cursor to a pixel on the chair having a light blue color represented by the red-green-blue video data triple of zero, zero, 31. The data processing unit 15 may operate the interface circuits 19 to receive the pixel address of that pixel. By addressing the pixel bit map with that pixel address, the data processing unit will read an index value of 1. Then, by comparing that index value to the indices in the text pointer table 27, the data processing unit will decide that it falls within the range of 0 to 31 specified for the pointer "STRING1." By addressing the text strings 26 starting at the pointer STRING1 and continuing up to but not including the next string pointer STRING2, the computer may read and display the text "CHAIR" which describes the chair.

Conversely, the user may enter the word "CHAIR" via the keyboard. The data processing unit 15 may obtain the word chair from the interface circuits 19, and search the text strings 27 for a match. The computer will then determine that the text entered by the user matches the text string starting at the address of "STRING1" and continuing up to but not including the pointer "STRING2." The computer may then search the text pointer table for the occurrence of these pointers, and thereby determine that the feature associated with the first text string is specified for indices ranging from 0 to 31. Then, by temporarily changing the video data stored in the color map 25 at the indices 0 to 31, the video display 11 will temporarily change the color of the chair to indicate to the user that the chair is a feature of the image responsive to the text that the user had entered on the keyboard 18.

Figure 3:
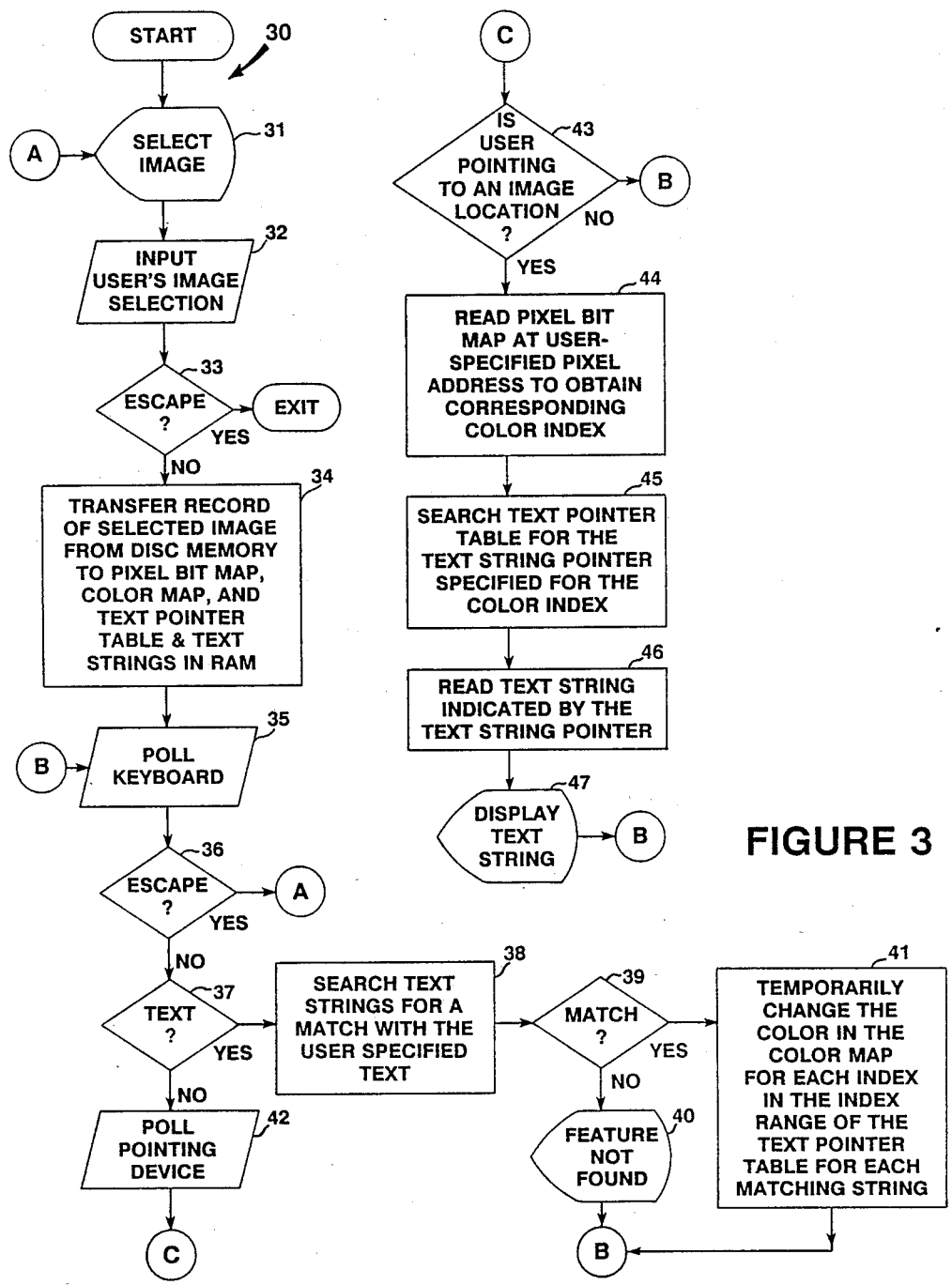
FIG. 3 is a flowchart of the procedure executed by a data processing unit in the system of FIG. 1.

Turning now to FIG. 3, there is shown a flowchart generally designated 30 of a control procedure for performing the operations just described. In the first step 31, the data processing unit 15 displays to the user a message requesting the user to select an image, it being understood that the disc memory 17 includes a plurality of images for selection by the user. In step 32 the data processing unit 15 operates the interface circuits 19 to input the user's image selection which is to be entered via the keyboard 18. If the user presses the "escape" key on the keyboard 18, then in step 33 the data processing unit recognizes that the user desires to terminate or exit from the control procedure. Otherwise, the user's response should be information identifying a particular image to be viewed. Therefore, in step 34, the data processing unit transfers the record of the selected image from the disc memory 17 to the pixel bit map 13, the color map 25, and preassigned memory locations in the random access memory 16 for the text pointer table 27 and the text strings 26.

To determine the specific identification operation desired by the user, in step 35 the data processing unit polls the keyboard by operating the interface circuits 19. As tested in step 36, if the user hits the "escape" key, execution jumps to step 31 to enable the user to select a new image. Otherwise, if text is received from the user, as tested in step 37, then in step 38 the data processing unit searches the text strings 26 for a match with the user specified text. If a match does not occur, as tested in step 39, then in step 40 a message is displayed to the user to indicate that a responsive feature cannot be found. Otherwise, the result of the match is a list of string pointers to the responsive text. In step 41, the data processing unit searches the text pointer table to determine the ranges of indices of the features corresponding to the string pointers. To display the responsive features to the user, the data processing unit temporarily changes the color in the color map for each index in the index range of the text pointer table specified for each matching string. This could be done a number of times to repetitively "flash" the responsive features.

If in step 37 it was found that the user had not entered text, then in step 42 the data processing unit operates the interface circuits 19 to poll the pointing device 20. In step 43, the data processing unit tests whether the user is pointing to an image location. If so, then in step 44 the pixel bit map 13 is read at the user specified pixel address to obtain a corresponding color index. Next, in step 45, the data processing unit searches the text pointer table for the text string pointer specified for the color index. One specific way of searching the text pointer table is to successively compare the index to each of the indices specified in the table. This method is illustrated by the computer program appended to the present specification. Once the text string pointer is obtained, then in step 46 the data processing unit reads the text string indicated by the text string pointer, and finally in step 47 the data processing unit displays the text string to the user. Execution then jumps back to step 35 to perform additional identification operations, if desired by the user.

Figure 4:
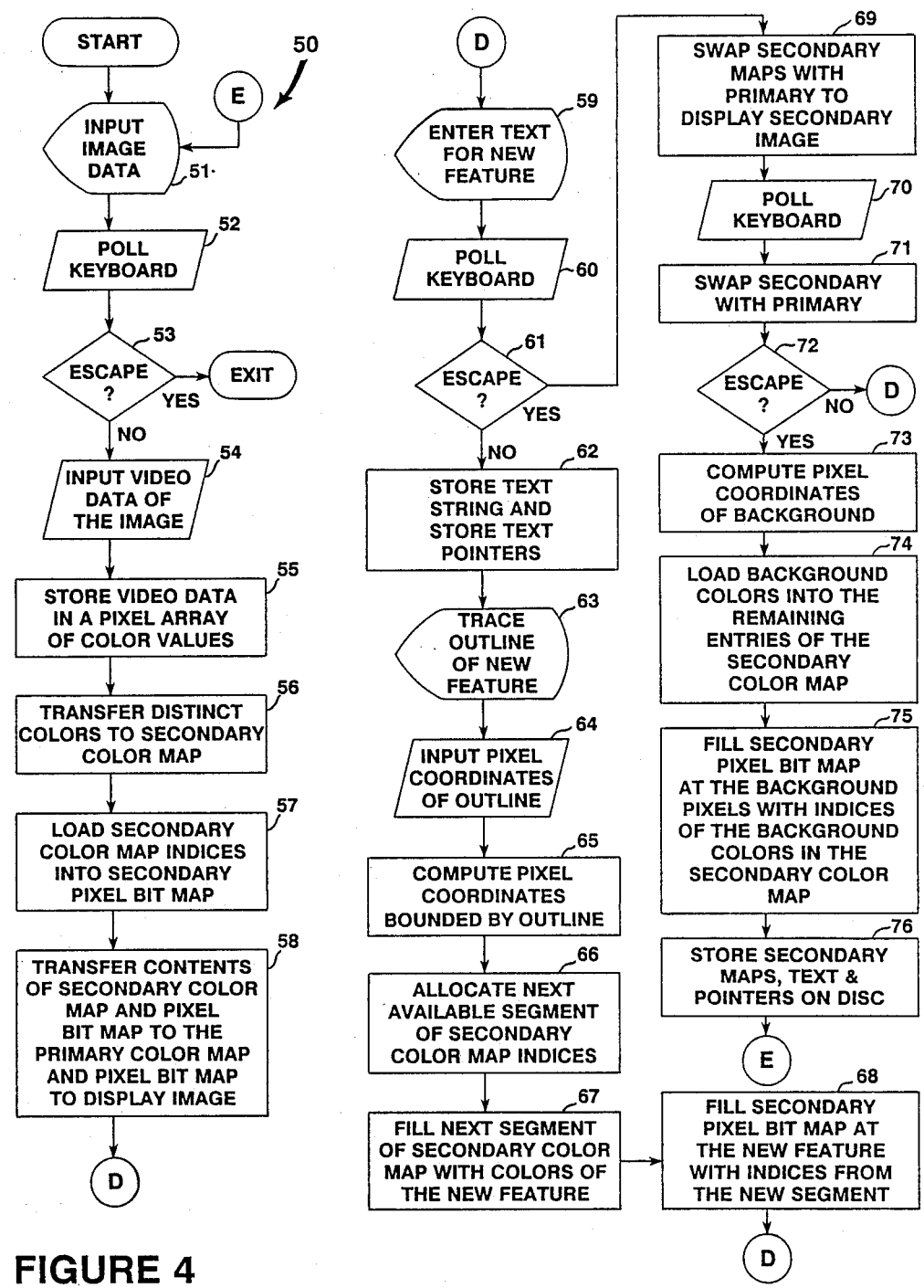
FIG. 4 is flowchart of the procedure executed by the data processing unit for encoding images and textual information describing their features in the format shown in FIG. 2.

Turning now to FIG. 4, there is shown a flowchart generally designated 50 of a control procedure for encoding an image to obtain the stored data in the format illustrated in FIG. 2. In the first step 51, the user is told to input image data. In order to terminate the program when desired by the user, in step 52 the keyboard is polled and in step 53 execution terminates if the user hits the "escape" key. Otherwise, the user hits the keyboard when the video data for an image is available. The video data, for example, is provided by a video camera (not shown), an analog-to-digital converter (not shown), and a frame buffer (not shown). In step 55 this video data is stored in the random access memory 16 in a pixel array of color values.

In order to display the raw image, in step 56 the distinct colors of the video data are transferred to a secondary color map area in random access memory 16. Also, in step 57 the secondary color map indices are loaded into a secondary pixel bit map set aside in the random access memory. In other words, the secondary pixel bit map and the secondary color map are set aside in order to construct a color mapped representation of the video image. In step 58, the color mapped video image is displayed by transferring the contents of the secondary color map and the secondary pixel bit map to the "primary" color map 25 and the "primary" pixel bit map 13.

In order to encode information about predefined features of the image, in step 59 a message is displayed telling the user to enter text describing a new feature. In step 60, the keyboard is polled to either receive the text or to receive an escape which would indicate that no more features are to be defined. This condition is tested in step 61. If text is entered, then in step 62 the text string is stored at the next available text string addresses, and the associated string pointers at the beginning of the string and just after the end of the string are stored in the text pointer table 27. Then, in step 63, the user is told to trace the outline of a new feature. To do this, the user operates the mouse 20. In step 64, the data processing unit inputs the pixel coordinates of the outline, and in step 65 computes the pixel coordinates bounded by the outline; these pixel coordinates have the same row addresses as the pixel coordinates of the outline and for each row address they include all of the column addresses within the column addresses of the pixels in the outline. Therefore, the location of the new feature has been specified by all of the pixels included in that feature. It should be noted, however, that a single feature may be comprised of entirely separate regions of pixels, in which case the user should outline each region included in the feature.

Next, in step 66, the next available segment of the secondary color map indices is allocated or set aside to receive the colors of the new feature. In step 67, this new segment of the secondary color map is filled with the colors of the feature. Similarly, in step 68, the secondary pixel bit map at the pixel addresses of the feature are filled with the indices from the new segment of the secondary color map memory. Execution then jumps to step 59 in order to define a new feature. Alternatively, the user may hit the "escape" key on the keyboard, so that in step 69 the new image being built up in the secondary bit map and the secondary color map will be swapped with the contents of the primary memories and therefore displayed to the user. This interactive displaying could be useful for permitting the user to decide how many color map memory addresses should be allocated to each feature. The user could, for example, be provided with the option of interrupting the control procedure and going back and allocating more color map memory addresses to the previously defined feature, or even for taking some color map memory addresses from some previously entered features and reallocating them to the feature that was just defined. In these cases of scarce color map memory, the user could make available additional memory addresses by eliminating certain colors from the features.

In step 70 the data processing unit polls the keyboard to determine whether the user is ready to go on and define another feature or to terminate the program. In step 71 the data processing unit first responds by swapping the contents of the secondary pixel bit map and the secondary color map with the contents of the primary pixel bit map and the primary color map. Then, in step 72, execution jumps back to step 59 to define another feature unless the user has entered an "escape" If so, then all of the features have been defined for the image being encoded. However, at this time the secondary pixel bit map and the secondary color map do not include the information for defining the background areas of the image which do not include any defined features.

In order to provide information about the background of the image, in step 73 the pixel coordinates of the background are computed or identified so that in step 74 the background colors can be loaded into the remaining entries of the secondary color map. Also, the pixel coordinates of the background are computed or identified so that in step 75 the secondary pixel bit map is filled at the background pixel addresses with indices of the background colors in the secondary color map. After this is done, the secondary pixel bit map and the secondary color map include the entire encoded image. Therefore, in step 76, the secondary maps, text and pointers can be stored in the disc memory 17 for use by the identification procedure of FIG. 3.

One advantage of segmenting the color map memory is that the pixel bit map for a feature and the color map segment for the feature are severable from the composite encoded image. Therefore, it is possible to independently compose or remove, edit, and reinsert the video data for a feature of the composite encoded image.

In view of the above, there has been described a video display terminal that allows a user to obtain descriptive information concerning a feature of a displayed image by pointing to the location of the feature. Conversely, the user may enter descriptive textual information, and the locations of responsive features are visually indicated. The digitized video images are efficiently stored along with textual information about various features of the images and information about the locations of the features in the images. In particular, the information about the video image is encoded as a pixel bit map and a color map in which the addresses or indices of the color map are correlated with the addresses or pointers to descriptive information about predefined features of the video image. The correlation between color map addresses and the descriptive information about the features is represented most compactly by arranging or sorting the entries in the colored map so that there is a correspondence between each predefined feature and a continuous range of color map addresses. Due to the high correlation in real-world images between color and features of interest, the memory capacity of the color map need not be substantially increased to provide the correlation between the physical locations of the features and the descriptive information about the features.

Although the invention has been described in connection with a specific embodiment that correlates textual information with the features of an image, the present invention is applicable to correlating other kinds of information about the defined features such as additional pictorial information for showing the selected features in greater detail, or predefined computer programs or subroutines which relate to the defined features. It should be apparent to one of ordinary programming skill that the specific embodiment of FIGS. 2 and 3 could be readily modified to provide these capabilities by substituting for the text strings either strings of pixel information or strings of computer program steps To provide an "histology atlas," it would be desirable to use a pointer table (27 in FIG. 2) having a column of pixel string pointers as well as a column of text string pointers. When the user selects a feature of the displayed image, a magnified view of the selected feature could be displayed along with the textual information describing the selected feature. Alternatively, a mouse (20 in FIG. 1) could be used having a pair of push-button switches, and either a magnified view of the selected feature, or the textual information about the selected feature, could be displayed depending upon whether the user activates one or the other of the push-button switches.

Strings of computer program steps could be useful for providing the user with a menu of choices about the selected feature. These menu choices could select data input and control options as well as data display options. Upon selection of a feature, the control procedure of FIG. 3 in step 46 would read the specified program string pointer from the string pointer table, transfer that pointer to the operand of an upcoming "jump" or "jump to subroutine" instruction, and then execute the "jump" or "jump to subroutine" instruction to thereby pass execution to the computer program steps specified for the selected feature.

In general, computer program steps specified for predefined features would permit the program flow to be altered in any desired fashion, including alteration of the original procedure for displaying the image, and execution of data input and control procedures related to the selected feature. This would be most useful for hierarchical operation of an interactive computer terminal in which the strings of computer program steps specified for certain high-level features would include steps to interrupt the display of an original image, recursively display a magnified image of the selected feature, and redisplay the original image upon returning from the interrupt. Therefore, a user could successively select more detailed features until reaching the highest available level of magnification representing a very specific feature or control function.

```
/*   ATLAS.1C   Copyright 1987 Mike Doyle   */ include "stdio.h"
define ESCAPE 27 main()

{
            static char device[] = "halonine.dev";
            static char pfile[] = "atlas.pal";
            static char *strucref[] = { "jgstruc1.txt",
                        "jgstruc2.txt",
                        "jgstruc3.txt",
                        "jgstruc4.txt",
                        "jgstruc5.txt",
                        "jgstruc6.txt",
                        "jgstruc7.txt",
```

```
            "jgstruc8.txt",
            "smstruc1.txt",
            "smstruc2.txt",
            "smstruc3.txt",
            "smstruc4.txt",
            "smstruc5.txt",
            "smstruc6.txt",
            "smstruc7.txt",
            "smstruc8.txt",
            "tmstruc1.txt",
            "tmstruc2.txt",
            "tmstruc3.txt",
            "tmstruc4.txt",
            "tmstruc5.txt",
            "tmstruc6.txt",
            "tmstruc7.txt",
            "tmstruc8.txt",
            "urstruc1.txt",
            "urstruc2.txt",
            "urstruc3.txt",
            "urstruc4.txt",
            "urstruc5.txt",
            "urstruc6.txt",
            "urstruc7.txt",
            "urstruc8.txt"} ;

char disc[21];
char *picname = "jga00000.pic";  /* picture file name          */
int picnum = 0;
int mode = 0;
int x, y, c, index, error, cx, cy, w;
int one = 1;
int zero = 0;
int maxcolor, xmax, ymax, height, width, sw;
setdev( device );           /* set up #9 board and gread picture     */
startgraphics( &mode );
pread( pfile, disc );
gread( picname );

inqdrange( &xmax, &ymax );
inqcrange( &maxcolor );
height = 10;
width = 10;

setlocator( &one, &one );              /* set up locator              */
inithcur( &height, &width, &maxcolor );
x = xmax / 2;
y = ymax / 2;
orglocator( &x, &y );
movhcurabs ( &x, &y );
do {
        do {    readlocator( &x, &y, &sw ); /* read locator position */
                movhcurabs( &x, &y );
                  if ( kbhit() )           /* button or ESC pushed  */
                     c = getch();
            } while ((( sw & 128 ) == 0 ) && c != ESCAPE );

movhcurabs( &x, &y);
```

```
        if (( sw & 4 ) == 4 ) {
            cx = x - 1; cy = y - 1;
            inqclr( &cx, &cy, &index );

if ( 0 <= index && index <= 31 ) {      /* correlates color index*/
                w = ( picnum * 8 ) + 0;              /* to strucref and sends */
                type( strucref[ w ] ); }             /* text filename to type */
            else if ( 32 <= index && index <= 63 ) { /* function             */
                w = ( picnum * 8 ) + 1;
                type( strucref[ w ] ); }
            else if ( 64 <= index && index <= 95 ) {
                w = ( picnum * 8 ) + 2;
                type( strucref[ w ] ); }
            else if ( 96 <= index && index <= 127 ) {
                w = ( picnum * 8 ) + 3;
                type( strucref[ w ] ); }
            else if ( 128 <= index && index <= 159 ) {
                w = ( picnum * 8 ) + 4;
                type( strucref[ w ] ); }
            else if ( 160 <= index && index <= 191 ) {
                w = ( picnum * 8 ) + 5;
                type( strucref[ w ] ); }
            else if ( 192 <= index && index <= 223 ) {
                w = ( picnum * 8 ) + 6;
                type( strucref[ w ] ); }
            else if ( 224 <= index && index <= 255 ) {
                w = ( picnum * 8 ) + 7;
                type( strucref[ w ] ); }

} else continue;
    } while ( c != ESCAPE );                         /* end infinite for loop */ setlocator( &zero, &zero );
    closegraphics();
    exit( 0 );

} /* end main */ type( fn )                                           /* function to use DOS TYPE command */
char *fn;
{
        char result[20];
        char *cmd;
        cmd = "type ";

strcpy( result, cmd );
        strcat( result, fn );

system( "cls" );
        system( result );

} /* end type */
```

What is claimed is:

1. A method of operating a video display system of the kind having memory for storing data, a data processor, and a video display including a video data input and means for displaying to said user an image having at certain image locations intensities responsive to video data received at said video data input, and a user operated input means for providing an indication of a location on said image, wherein said memory includes means for storing said video data in an indexed data structure having data elements associated with respective indices having different values, said method comprising the steps of:

storing in said memory a first map specifying video data for each of a plurality of indices, storing in said memory a second map specifying one of said indices for each of said image locations, storing in said memory respective additional data about predefined features of said image, said features occurring at certain of said image locations, said second map specifying for said features respective ones of said indices at said certain of said image locations, said respective additional data being specified for said respective ones of said indices, displaying said image to said user by reading said second map to obtain the indices specified for said image locations, reading said first map to obtain the video data specified for the indices read from the second map, and transmitting the specified video data to the video data input of said video display, operating said input means to receive an indication of a location on said image at which one of said features occur, reading said second map to obtain the index specified for the indicated location, and reading and displaying to said user the respective additional data for said index.

2. The method as claimed in claim 1, wherein said means for displaying also displays chromaticities responsive to the video data received at said video data input.

3. The method as claimed in claim 2, wherein said video display includes a raster-scanned color cathode ray tube.

4. The method as claimed in claim 1, wherein said input means includes a light pen sensitive to the intensity displayed by the video display at a location selected by manual positioning of the light pen.

5. The method as claimed in claim 1, wherein said input means includes means for manually commanding movement of a cursor displayed at a certain image location, and means for receiving a command for accepting the cursor location as the indicated location on said image.

6. The method as claimed in claim 5, wherein said input device is a mouse.

7. The method as claimed in claim 1, wherein said certain image locations are arranged as a matrix of pixels.

8. The method as claimed in claim 1, wherein said respective additional data are stored as respective lists, and a set of pointers to said lists, said pointers being indexed by said respective ones of said indices.

9. The method as claimed in claim 8, wherein said respective ones of said indices for each feature are included in continuous numerical ranges, said pointers are stored with respective numerical range limits, and the respective additional data are read for said index by comparing said index to the respective numerical ranges to determine the respective pointer.

10. The method as claimed in claim 1, wherein said respective additional data comprise descriptive text strings for the features.

11. The method as claimed in claim 1, wherein said respective additional data comprise video data for displaying the features with increased magnification.

12. The method as claimed in claim 1, wherein said step of reading and displaying comprises the step of executing respective computer programs predefined for the predefined features of said image.

13. A method of operating a video display system having a data processor, a color video display including means responsive to video data for specifying the color which is displayed at respective pixel locations on an image, a manually operated input means for specifying a pixel location, and a memory including means for storing data in an indexed data structure having data elements associated with respective indices having different values, said memory storing data including a color map specifying video data for each of a plurality of indices, a pixel bit map specifying one of said indices for each of said pixel locations thereby defining the content of said image, said image having a plurality of predefined features, said features occurring at certain of said pixel locations, said pixel bit map specifying for each of said features respective ones of said indices at said certain of said pixel locations, said memory also storing respective strings of descriptive text for said features, said text strings being specified for said respective ones of said indices, said method comprising the steps of:

operating said input means to receive an indication of a specified pixel location, reading said pixel bit map to obtain the index specified for the specified pixel location, reading the text string specified for said index specified for the specified pixel location, and displaying the text string specified for the index specified for the specified pixel location.

14. The method as claimed in claim 13 wherein said text strings are specified for said respective ones of said indices by respective text string pointers stored in said memory, and specified for said respective ones of said indices, and wherein said step of reading the text string comprises the steps of reading the pointer specified for the index specified for the specified pixel location, and read in the text string indicated by the pointer so read.

15. The method as claimed in claim 14, wherein said respective ones of said indices for each feature are included in continuous numerical ranges, said pointers are stored in said memory along with limits of the respective numerical ranges, and said step of reading the pointer includes the step of comparing the numerical range limits to the index specified for the specified pixel location.

16. A video display system for displaying an image to a user and permitting the user to point to predefined features of the image and obtain descriptive information about the specified features, said video display system comprising, in combination:

a color video display for displaying text and images, said video display including means responsive to video data for specifying the color which is displayed at respective pixel locations on said image, manually-operated input means for enabling the user to point to a specified pixel location, a memory including means for storing data in an indexed data structure having data elements associated with respective indices having different values, said memory storing data including a color may specifying video data for each of a plurality of indices, and a pixel bit map specifying one of said indices for each of said pixel locations thereby defining the content of said image, said image having a plurality of predefined features, said features occurring at certain of said pixel locations, said pixel bit map specifying for each of said features respective ones of said indices at said certain of said pixel locations, said memory also storing respective strings of descriptive information for said features, said string being specified for said respective ones of said indices, means responsive to said input means for reading said pixel bit map to obtain the index specified for the specified pixel location, means for reading the string specified for said index specified for the specified pixel location, and means for operating the video display in response to the string so read.

17. The video display system as claimed in claim 16, wherein said respective ones of said indices for each feature are included in continuous numerical ranges, the limits of said numerical ranges are stored in said memory, and said means for reading the string includes means for comparing the limits to said index specified for the specified pixel location to determine the continuous numerical range including said index and thereby determine the feature indicated by the user, and means for reading the string which describes the indicated feature.

18. The video display system as claimed in claim 16, further comprising means for receiving descriptive information from the user, means for comparing the information received from the user to the descriptive strings to select at least one descriptive string which is responsive to the descriptive information received from the user, means for reading the memory to determine the set of indices for which the selected string is specified, and means for changing the video data in said color map that are specified for the indices in said set of indices, to thereby provide a means for visually indicating to the user the predefined features in the image which are responsive to the descriptive information received from the user.

19. The video display system as claimed in claim 16, wherein said strings are strings of text, and said means for operating the video display includes means for displaying the string so read.

20. The video display system as claimed in claim 16, wherein said strings are strings of pixel information defining their respective features with increased magnification and resolution, and said means for operating the video display includes means for displaying the string of pixel information so read.

21. The video display system as claimed in claim 16, wherein said strings are strings of computer program steps defining respective computer programs relating to the predefined features and said means for operating the video display includes means for executing the string of computer program steps so read.

22. A method of operating a video display system having a data processor, a color video display including means responsive to video data for specifying the color displayed at respective pixel locations on an image, means for receiving descriptive text form the user, and a memory including means for storing data in an indexed data structure having data elements associated with respective indices having different values, said memory storing data including a color map specifying video data for each of a plurality of indices, a pixel bit map specifying one of said indices for each of said pixel locations thereby defining the content of said image, said image having a plurality of predefined features, said features occurring at certain of said pixel locations, said pixel bit map specifying for each of said features respective ones of said indices at said certain of said pixel locations, said memory also storing respective strings of descriptive information for said features, said strings being specified for said respective ones of said indices, said method comprising the steps of:

operating said means for receiving to receive descriptive text from the user, comparing the text received from the user to the descriptive strings to select at least one of the descriptive strings which is responsive to the descriptive text received from the user, reading the memory to determine the set of indices for which the selected string is specified, and changing the video data in said color map that are specified for the indices in said set of indices, to thereby visually indicate to the user the predefined features in the image which are responsive to the descriptive text received form the user.

23. A method of operating a data processor having a memory in order to encode and store in said memory video data representing a color image together with descriptive text about certain predefined features of said image and the locations of said features in the image, said image being subdivided into pixels at locations on said image, said features comprising certain predefined sets of said pixels, said memory including means for storing data in an indexed data structure having data elements associated with respective indices having different values, said method comprising the steps of:

storing in said memory a color map including at least one entry for each different color to be included in said image, and additional entries for each color occurring both inside and outside a predefined feature so that a unique entry is provided for each color included in a distinct combination of features, the color map entries being addressable by respective indices, each index thereby having associated with it a predefined set of features and a certain color, storing in said memory data describing the features associated with each index, and storing in said memory a pixel bit may specifying for each pixel the index for the combination of features including that pixel and addressing the image color at the pixel location.

24. The method as claimed in claim 23, wherein said data describing the features associated with each index comprises data indicating the set of features associated with each index, and data describing each feature.

25. The method as claimed in claim 24, wherein the data describing each feature includes a string of descriptive text.

26. The method as claimed in claim 24, wherein the indices for each feature form a consecutive numerical range of indices, and wherein the data indicating the set of features associated with each index include limits of the numerical range of the indices for each feature.

27. The method as claimed in claim 23, further comprising the steps of storing in memory the video data indicating the color of the image at each pixel location, and for each feature, storing in memory the set of pixel locations to be included in the feature and allocating a consecutive numerical range of indices to the feature.

* * * * *

UNITED STATES PATENT AND TRADEMARK OFFICE
CERTIFICATE OF CORRECTION

PATENT NO. : 4,847,604

DATED : July 11, 1989

INVENTOR(S) : Michael D. Doyle

It is certified that error appears in the above-identified patent and that said Letters Patent is hereby corrected as shown below:

```
In Col. 6, line 15, after "display" please insert --11--.
In Col. 6, line 57, please change "190" to --#--.
In Col. 8, line 23, please change "STRINGI" to --STRING1--.
In Col. 10, line 55, after "'escape'" please insert --.--.
In Col. 18, line 36, please change "read in" to --reading--.
In Col. 18, line 53, please change "." to --,--.
In Col. 18, line 55, please change "." to --,--.
In Col. 18, line 60, please change "may" to --map--.
In Col. 19, line 3, please change "string" to --strings--.
In Col. 19, line 7, please change "." to --,--.
In Col. 20, line 20, please change "form" to --from--.
In Col. 20, line 44, please change "may" to --map--.
```

Signed and Sealed this

Thirty-first Day of July, 1990

*Attest:*

HARRY F. MANBECK, JR.

*Attesting Officer*     *Commissioner of Patents and Trademarks*